Figure 1:
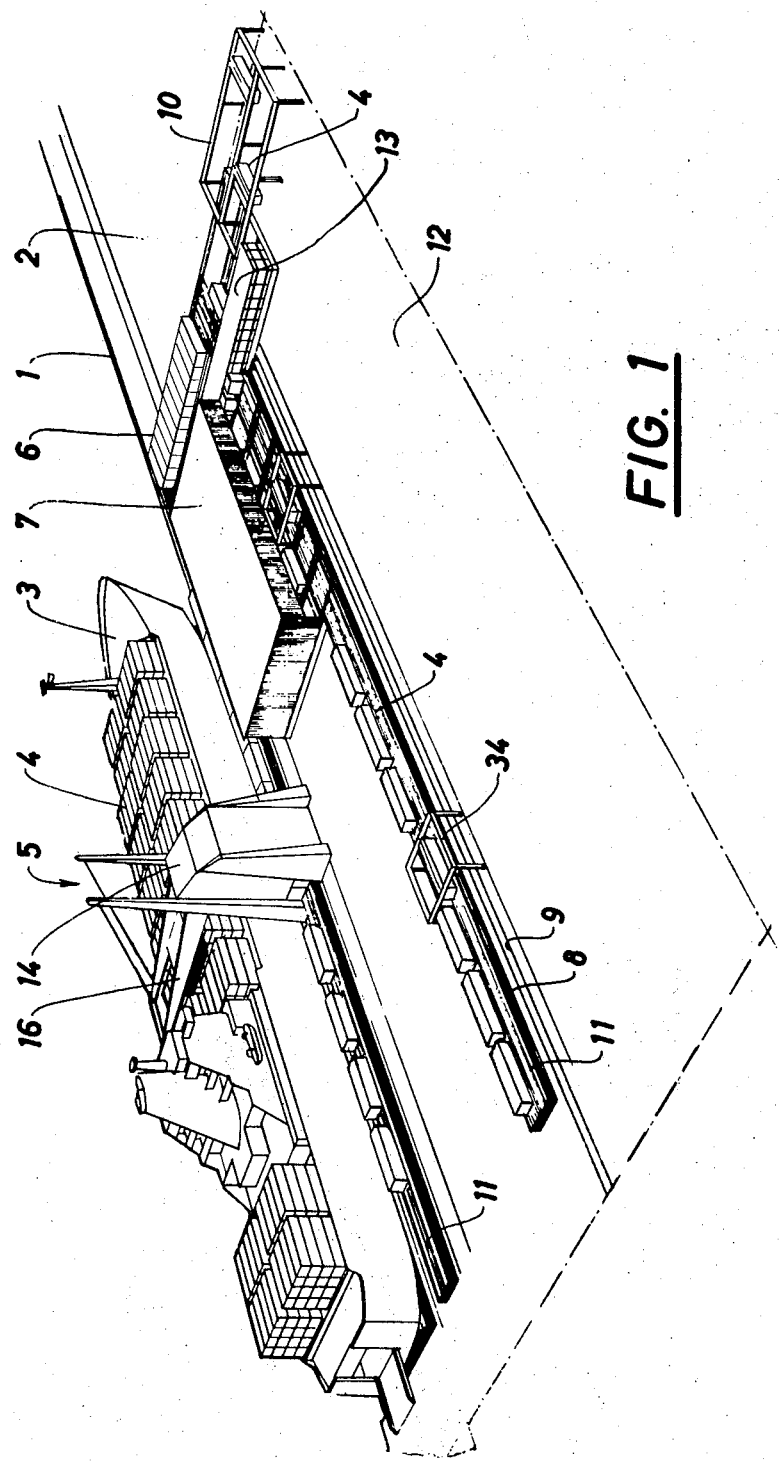

United States Patent [19]
Anderson

[11] 3,807,582
[45] Apr. 30, 1974

[54] LOADING AND UNLOADING DEVICE FOR SHIP CONTAINERS

[76] Inventor: Leif P. R. Anderson, Bogaton 39A, 41273 Goteborg, Sweden

[22] Filed: Feb. 7, 1972

[21] Appl. No.: 223,876

[30] Foreign Application Priority Data
Feb. 5, 1971  Sweden.............................. 1433/71

[52] U.S. Cl. ................................................ 214/14
[51] Int. Cl. ............................................ B65g 67/58
[58] Field of Search ............................ 214/14, 15 R

[56] References Cited
UNITED STATES PATENTS
3,630,390  12/1971  Tax et al............................... 214/14
2,651,087  9/1953  Fellows............................... 214/59 R
2,696,921  12/1954  des Jardins................... 214/16.1 BB
2,355,213  8/1944  Flanagan............................... 214/14
3,519,147  7/1970  Walda............................... 214/15 R FOREIGN PATENTS OR APPLICATIONS
953,530  3/1964  Great Britain..................... 214/15 R Primary Examiner—Frank E. Werner

[57] ABSTRACT

A loading and unloading installation for standardized types of load units such as containers, to and from a ship docked at a wharf with means for raising or lowering said load units in the ship hull, gripping said load units and moving the same horizontally from the ship over the wharf to a second raising or lowering means on said wharf.

6 Claims, 6 Drawing Figures

LOADING AND UNLOADING DEVICE FOR SHIP CONTAINERS

The present invention relates to a loading and unloading device for load containers of standardized types to be transported by ships and which at the unloading operation shall be transported from the hold of a ship to a level situated higher up and at said higher level being transported to a position above a loading wharf and further from said higher level shall be lowered down to the plane of the wharf, the sequence in reverse taking place at the loading operation.

The use of standardized load units, containers, provides great possibilities for rationalization with respect to the work of transfer compared to the handling of case-goods. Containers in themselves signify a considerable rationalization, as at each displacement operation the handling of a single container substitutes the earlier handling of a number of case-goods units. Moreover, the containers and other kind of load units can be designed to be adapted for simplified and even automatized installations of lifting means and other means of displacement. However, the very transportation operation involving the displacement of moving the containers from the hold of the ship to the wharf is still carried out by conventional methods. Thus, each cycle involves the lifting up of the goods by a hoisting crane, sidewise displacement by the turning movement of the crane, and the subsequent lowering down operation. At the wharf level the load units are transported by gable trucks in order to be loaded on, respectively being unloaded from trucks and railroad cars. Intermediate storage generally is arranged by accomodating the containers in a simple layer on a vast area adjacent to the wharf.

The handling methods mentioned signify a deficient expoitation of the existing possibilities for rationalization. Thus, the displacement operation by means of a wire hoist crane which shall perform vertical as well as horizontal displacement over distances of considerable length and at a very limited speed, involves a time-consuming task at the same time that great peril of damage arising from pivoting loads is an ever present menace. When the wind has a great force it is impossible to carry out the work. Also the transportation by means of trucks is a relatively time-consuming task and requires a considerable mobilization of labour force. As examples of other drawbacks in connection with the conventional handling one can mention such ones as the very great areas for intermediate storage often being required which in practice means that container harbours often have to be built entirely new, because of sufficient space near the earlier port installations not being available. At the same time the distances for transportation by trucks will be considerable.

It is an object of the present invention to eliminate the handling by means of wire hoist cranes by employing an installation in which the lifting, the sidewise transportation and the lowering down operations are divided up between different means of displacement, the time required thereby being reduced at the same time as these devices are designed to practically eliminate the risk of damage.

Another object of the invention is to provide an installation which suitably can be combined with a plant for storage and transportation located at the loading wharf, said installation comprising loading means for different hauling equipment and permitting a very rational handling of the load units including also open air work at wharf level.

The objects of the invention are obtained by designing the installation in such a way that it is characterized by one on a bar displaceable carriage device being arranged for sidewise transportation in said upper position, said carriage being equipped with gripping means which can be operated by remote control and serve the purpose of holding and releasing the load units and by a lifting device arranged to operate simultaneously with said carriage for carrying out the vertical transporation between said upper position and a place on the wharf, while the transportation between the load accomodations on board and the carriage device is carried out by a special lifting device.

Figure 2:
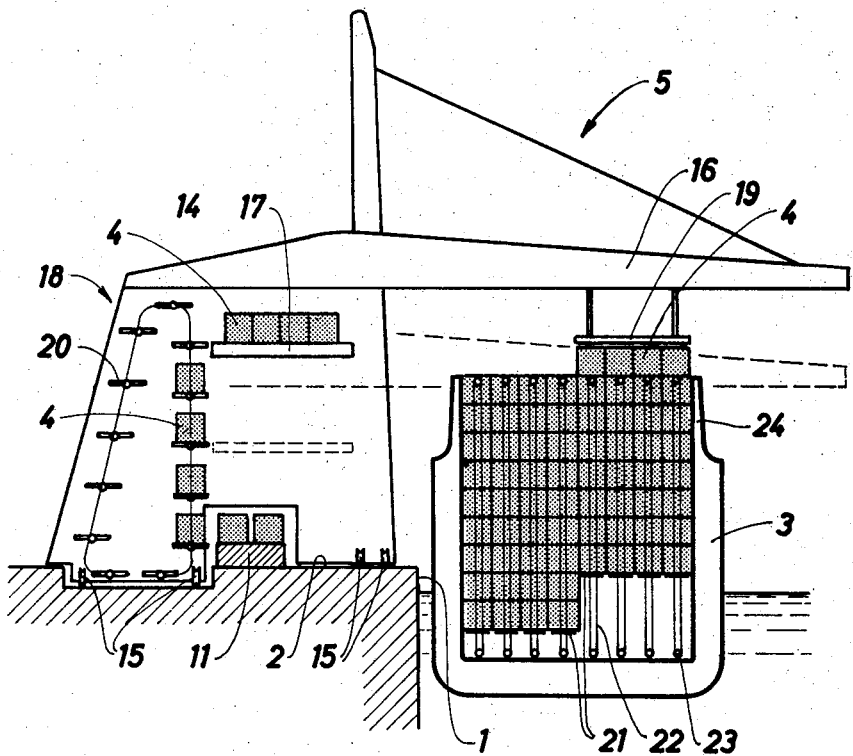
Figure 3:
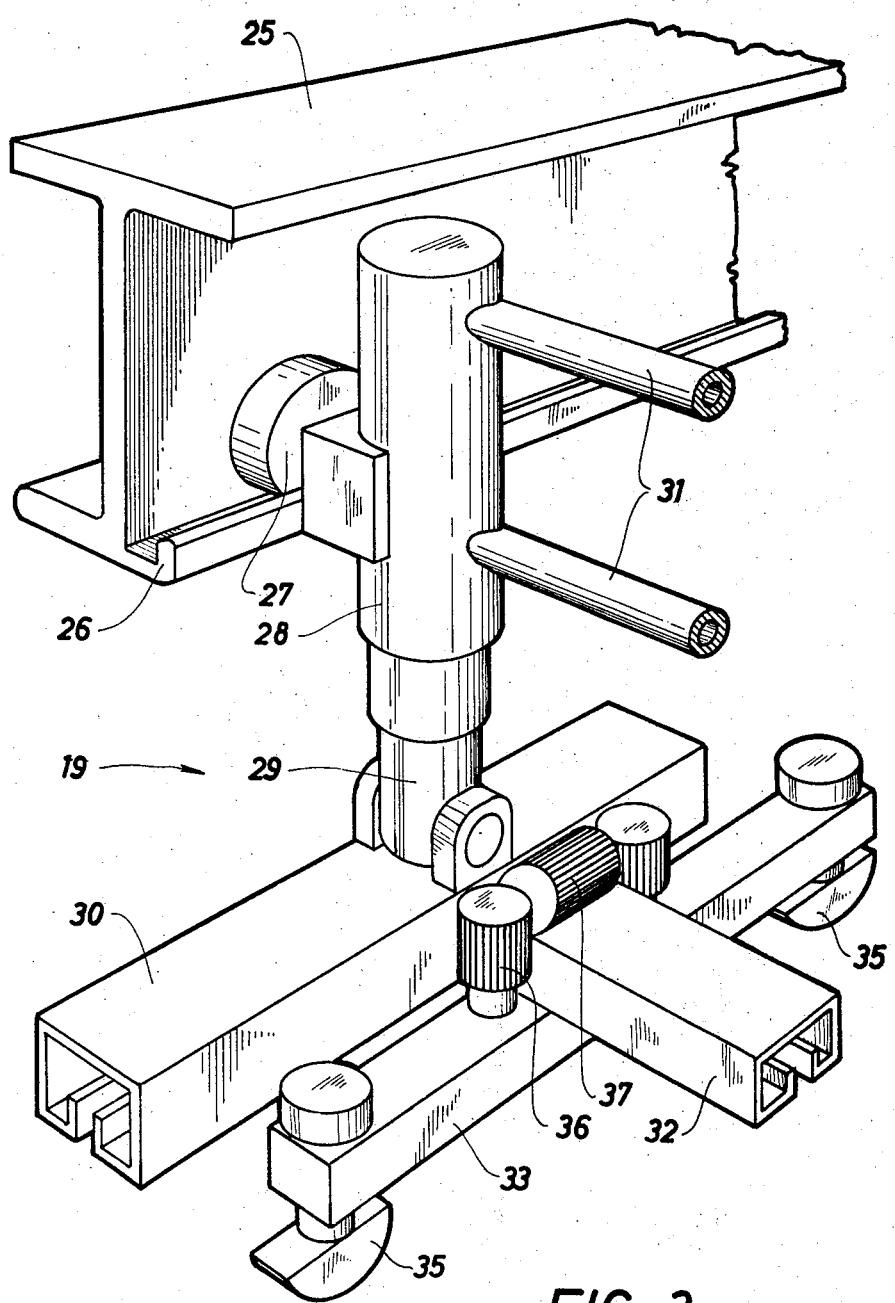
Figure 4:
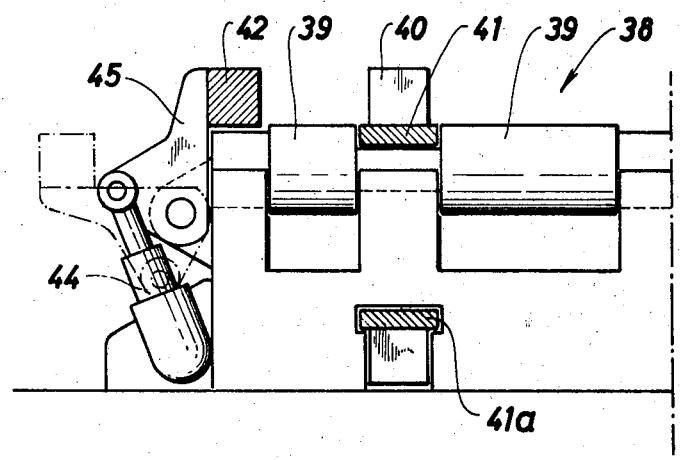
Figure 5:
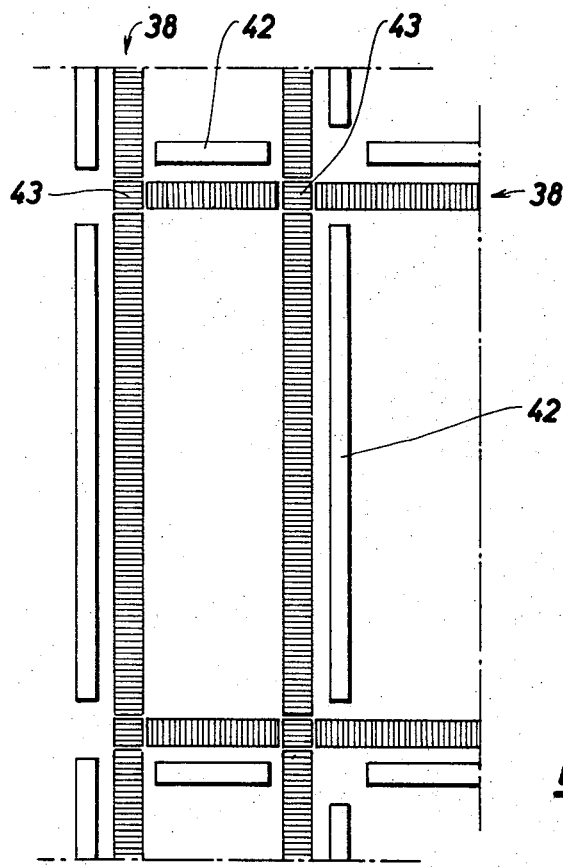
Figure 6:
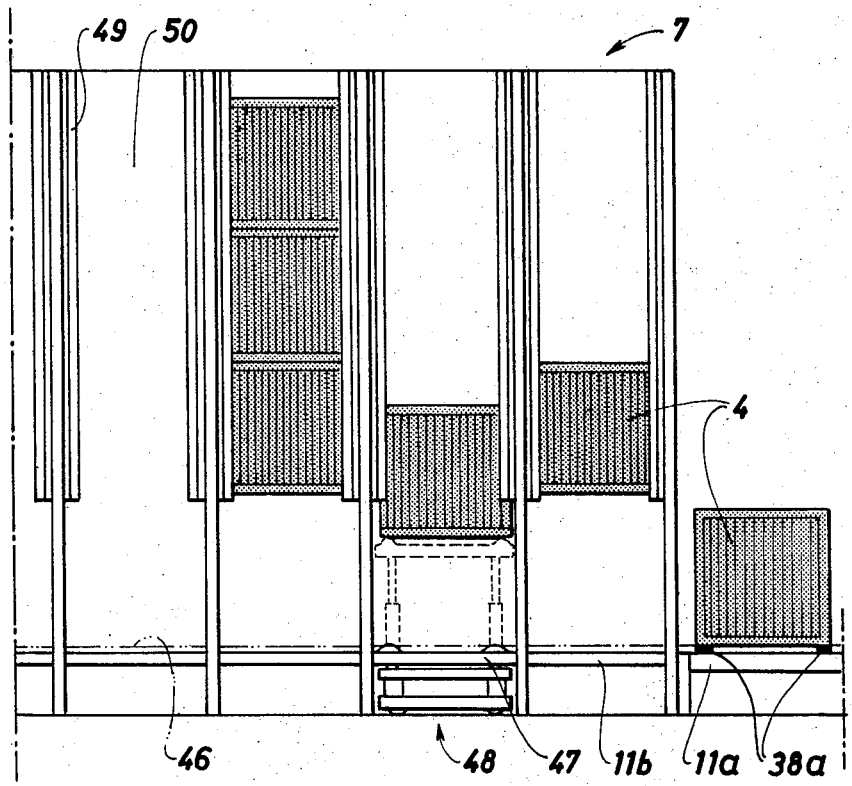

In the accompanying drawings a complete installation for the transportation of the load units from the hold of a ship to trucks and railroad cars is illustrated as an example of an embodiment of the invention. In the drawings:

FIG. 1 is an overall view of the whole installation with a ship in place at the wharf and a number of containers as they appear during different phases of their handling, FIG. 2 is a partly broken view of the device according to the invention, serving the purpose to transport the load units between the hold of a ship and the wharf plane, FIG. 3 is a perspective view on an enlarged scale illustrating a detail of a device for sidewise transportation entering into the installation shown in FIG. 2, FIG. 4 is a cross sectional view of a conveyor for the transportation of the load units on the wharf, FIG. 5 is a top view, on a smaller scale, of the same conveyor which is illustrated in FIG. 4 and FIG. 6 is a vertical section through a warehouse installation.

In FIG. 1 a wharf with the edge 1 of the embankment and the plane 2 of the wharf with a ship 3 moored to the edge 1 of the embankment are illustrated. The ship 3 in its hold and above the same at deck level carries a number of containers 4, a travelling loading and unloading installation 5 displaceable along the edge 1 of the embankment being arranged for the transportation of said containers between the ship 3 and the plane 2 of the wharf. Between the area of displacement of said installation and a buffer storage 6, a warehouse 7, a loading platform 8 for railroad cars coming on the railroad track 9 there are conveyor installations 11. In connection with the loading device 10 there is a parking place 12 for the trucks and their trailers, and in connection with the buffer storage 6 there is a control installation 13 for the direction of the routings, by means of which the different containers can be directed via different routes to and from the different loading places 5, 8, 10 and the warehouse 7.

In the following the different parts of the installation will be described in their turn, but in order to facilitate the understanding thereof, a general outline of their functioning will first be described. At the unloading of a ship 3, the load units 4 by means of the installation 5 are lifted up from their location on board the ship, then they are transported in sidewise displacement to a point above the wharf from where they are lowered down and placed on the conveyor 11, said installation 5 successively being displaced along the edge 1 of the embankment and reaching over the different sections of the ship 3. On the conveyor 11 the load units 4 are moved by power and are shunted, their direction of travel thereby is changed 90° to the buffer storage 6, from where they according to the labeling which they exhibit, by direction from the installation 13 are routed to the loading platform 8 in order to be lifted up and by means of the loading device 34 by sidewise transportation be brought above and lowered down on railroad cars located on the track 9, or alternatively for similar handling be routed to the loading device 10 in order to be transferred to trucks which one after another are brought forward from the parking lot 12, or alternatively to the warehouse 7, where they are stored pending further handling. The installation 13 for the direction of the operations then suitably is arranged for the registration of the location of the respective load units in the warehouse 7, so that they automatically can be removed in desired order. At the loading operation of a ship the sequence is the reverse.

The loading and unloading installation 5 is illustrated in a side elevational view in FIG. 2, where the cross section of the ship 3, the edge 1 of the embankment, and the plane 2 of the wharf are shown. As is also evident from FIG. 1 the installation 5 is carried by a strong structure 14, which by means of a number of wheels 15 can be moved on rails of which these two located farest away from the edge 1 of the embankment are submerged in a channel below the plane 2 of the wharf, as shown.

The abovementioned structure 14 supports an by conventional means stayed and counterweighted bracket arm structure 16, a conveyor 17, and a paternoster elevator 18. The bracket arm structure 16 and the conveyor 17 are vertically displaceable in the structure 14 as is hinted by dashed lines in FIG. 2. However, the feature of being vertically displaceable has nothing to do with the displacement of the load, as this arrangement instead means an adjustment possibility to adapt the installation to different ships and their loads. The bracket arm structure supports a carriage 19, which can travel on the bracket arm structure 16 between the outer end of the same and a position above the conveyor 17. The carriage 19 is provided with coupling means for remote control which can grip load units 4 located below enabling them to be lifted up, so that they are freed from their bed and by means of the carriage 19 can be transported between said two end positions. From the conveyor 17 the load units 4 by power means in turn are transported to platforms 20, also these platforms each one being provided with a conveyor and belonging to the elevator 18. The elevator 18 is arranged to displace the platforms 20 step by step by which operation the load units 4 one by one can be transported between the above mentioned conveyor 11 on the wharf and the conveyor 17 in upwards or downwards direction.

As is evident from the foregoing the installation 5 is not equipped with any lifting means for the vertical transportation in upwards direction from the interior of the hull of the ship. This vertical transportation instead is provided by elevators incorporated into the installations of the ship 3, one elevator for each vertical row of containers. Each elevator comprises a long platform 21 designed to support a horizontal row of load units, the ends of said platform running in guides, the elevator means further comprising chains or steel cables 22 driven by motors 23 in order to raise the platform. The lifting range served by said elevators 21 extends from the bottom level to the top loading level. According to FIG. 3 the ship is suitably designed in such a way that its load including the part thereof corresponding to the so called deckload is surrounded by sidewalls 24, the lifting means then having capacity to raise the platforms up to the edges terminating the walls 24. In order to close the openings of the holds between said edges, hatches in conventional manner may be arranged. The sidewalls or bulkheads mentioned which enclose the deckload are not shown in FIG. 1 in order to permit better surveyability.

From FIG. 3 it is more in detail evident how the carriage 19 is designed. According to this Figure the bracket arm installation 16 is provided with beams 25 in pairwise arrangement, each one having a flange designed as a rail. Four wheels 27 located in the corners of the carriage 19 can travel on this track. Each one of the wheels 27 is mounted on a hydraulic cylinder 28 supporting a telescopic piston 29, together four pistons which in pairwise arrangement are connected by means of two railbeams 39 which together with cross stays 31 comprise the chassi of the carriage. A number of cross beams 32 are suspended in the longitudinally extending beams 30, said cross beams each one at both ends supporting a lifting yoke 33, provided with gripping means 35, operated by remote control and designed to couple the containers. By means of a driving mechanism provided with rollers 36, 37 the yokes 33 can be displaced for one part in direction of the beam 30 and for another part in direction of the beam 32, and by this arrangement the lifting yokes as to their position can be adjusted to the measurements of the containers to be handled in each case so that the gripping means 35 can be brought to engage with lifting points provided on the containers. The short vertical movement required in order to permit the containers to be lifted from the bed for sidewise transportation by the movement of the carriage 19 is produced by means of the hydraulic power installation comprising the hydraulic cylinders 28 and the pistons 29. The sidewise movement of transportation is suitably produced by the propulsion of the wheels 27 by hydraulic motors. As is evident from FIG. 3 the gripping means 35 can be arranged to make a hooking engagement by a turning movement which can take place employing hydraulic power. The yokes 33 can be designed pairwise to lift only one container, the carriage 19 then supporting several pairs of yokes with crossbeams 32 belonging to them, but each one of the yokes also can be provided with a number of gripping means in order to support several containers simultaneously.

It should not be necessary to give a more detailed description of the design of the conveyor 17 and the elevator 18 as such installations already are well known. However, the conveyor 17 may be arranged in a similar way as the conveyor 11 which will be described in the following. It shall also be observed that the elevator 18 is provided with guides in order to conserve a horizontal position of the platforms 20 which travels in a closed circuit and it is further provided with driving means suitably in the shape of chains. For the return movement of the platforms a return path in conventional manner is provided as well as an upper and a lower cross track for the transfer of the platforms between the two paths, the lower cross track because of space considerations being located in the channel in the wharf mentioned earlier.

The conveyors 11 as is evident from FIG. 1 extend over a vast area and are designed for transportation of the containers for one part in crosswise direction and for another part in longitudinal direction in one or several rows. The conveyor plane itself is then located at a height level corresponding the height of a normal loading bridge 1,2 metres, and therefore the machinery of the conveyor can be housed within the range of that height. Each conveyor comprises two parallel "rails" 38 according to FIGS. 4, 5, each one designed to support a border portion of a container 4. Such containers are namely generally designed with a rigid frame in which nonsupporting planes and hatches are inserted. The containers therefore shall be supported with the frame resting upon a bed or by being suspended in lifting means (compare the gripping means 35 in FIG. 4). In accordance herewith the "rails" 38 or more specifically the edge tracks are arranged to support the borders of the underside of the frame by means of rollers 39, the top portions of which are located in the transportation plane mentioned. The rollers 39 are idlers and in order to convey the containers there are driving pushers 40, which are moved by means of motor driven belts or chains. A space is provided below the rollers 39 for the return part 41a of the belt and chain respectively 41. In order to guide the containers the outer edges of the edge tracks 38 are provided with guiding rails 42.

When the direction of the containers is to be changed (see FIG. 1) it is because of space considerations not suitable to design the paths with curves, the containers instead are shunted over to another track at an angle of 90°. This operation is taking place by means of a shunting station illustrated in FIG. 5 located where the four edge tracks 38 cross said station, exhibiting four square carrier 43 provided with rollers which by power means can be lowered, turned by 90° and again be raised. The shunting off operation is carried out by first letting the container roll on until it occupies a position right over the center of the switching station, the carriers 43 then being placed in such a position that the rollers can rotate in the same direction as the incoming track, whereafter, when the container has been halted in its movement right over the shunting station, said carriers are lowered, made to perform a 90° turn, and then raised again. Hereafter the container can continue its travel rolling in the new direction with the other two borders of its bottom frame now contacting the new track. The movement and the stop positions of the driving pushers 40 (FIG. 5) are suitably synchronized with the shunt station and the changeover of the carriers 43, so that an automatic rerouting of the direction of travel is obtained. It may also be suitable to design the square carriers so that they can raise a small portion of the incoming track a short bit when their own position corresponds to the direction of movement along said track so that the edges of the container not supported by the transporting conveyor need not be dragging on the cross track. Such a lifting movement can also be provided in connection with the necessary lowering of the upsticking runners 42 of the incoming track which the container is just going to leave. The way such a lowering down operation shall be carried out is illustrated in FIG. 4 where the runner 42 is mounted on a pivotable lever arm 45 operated by hydraulic means 44. Such downwards pivotable runners are only necessary at the switch stations and the other runners can occupy a fixed position. The movements of the runners should of course also be synchronized in the manner previously mentioned.

The loading installations 10 and 14 delt with previously and illustrated in FIG. 1 each one comprises carriages, similar to those illustrated in FIG. 4, supporting a frame structure and arranged for the raising of the container a short distance above the bed for the sidewise displacement of it between the conveyor 11 and the loading plane of the respective hauling means and for its lowering down on said plane.

The warehouse 7 which is located at the side of one of the conveyors 11, here indicated at 11a, equipped with edge tracks 38a (FIG. 6) has its lower plane 46 located in the transportation plane mentioned in which also the top portions of the rollers 39 are placed (FIG. 4). The plane 46 is represented for one part by the upper plane of a lifting table 47 of a lifting carriage 48, when said plane occupies its lowermost position, and for another part by a number of conveyors 11b extending into the interior of the warehouse (parallel to the plane of the paper sheet in FIG. 6) which conveyors are connected to the conveyor 11a by shunt stations (see FIG. 6). The warehouse in the space above the height of the container 4 placed at the level 46, is provided with a number of guides 49, which in groups form compartments 50, into which the containers can be brought up by means of the lifting up action of one of the tables 47 which each one can be moved into positions located below certain ones of said compartments. At the bottom edge of the compartments 50 there are blocking means, not shown, which can be activated to hold a container introduced in the compartment so that it is being suspended in the position illustrated for the container 4 in the left one of the compartments shown in FIG. 7. Each compartment 50 is, however, designed to store several containers, one on top of the other, according to FIG. 7 three units. From a construction viewpoint it is simpler to design the lifting carriage 48 for a short lifting height, even if it would require an increase of the lifting power, and therefore the lifting height only corresponds the approximate height of one container. When the subsequent containers are going to be introduced into a compartment, the ones occupying a position above therefore have to be lifted together with the new container until the latter one can be engaged by the blocking means mentioned and support the other containers. In the operation of removal the blocking means are released and the lowest container is lowered until the next one in turn is engaged by the again activated blocking means. If the lowest container is not going to be removed, but a container in a higher position, then the container in the lower position is brought further into the warehouse to a compartment where there is space available and is placed there, whereafter the lifting carriage fetches the desired container positioned at the lower level in the first mentioned compartment.

As a supplement to the foregoing schematic description of the functioning of the installation a more detailed description is given in the following:

When a ship 3 has been moored to the edge 1 of the embankment and the hatches have been removed, decision is taken with respect to which cross row of containers shall be unloaded first. Hereafter, the installation 5 on its rails along the edge 1 of the embankment is brought into a position above said row and is adjusted with its bracket arm installation 16 at such a level that the gripping means 35 (FIG. 3) are at a suitable height for engaging containers which with their bottoms are immediately above the upper edges of the bulkheads 24 (FIG. 2). Hereafter, the carriage 19 is moved on its wheels 27 (FIG. 3) along the bracket arm installation 16 to a position above the containers 4 which shall be unloaded first. At the same time the corresponding platforms 21 (FIG. 2) by means of their motors and wires are raised so that the containers placed on them are lifted up to the height level mentioned, with the bottoms above the top edges of the bulkheads 24. After a possibly necessary fine adjustment carried out by displacing the beams 32 and 33 (FIG. 3) by means of the rollers 36, 37 the gripping means 35 operated by remote control are brought into engaging position relative to the lifting points of the containers 4, whereafter the containers are raised a little from the containers situated below the introducing pressure medium in the cylinders 28. Hereafter the carriage 19 is brought to move in inwards direction until it has reached a point right above the roller platform 17, onto which the containers are placed by lowering them by means of the hydraulic installation 28, 29 and the inactivation of the gripping means 35.

While this is taking place the vertical row of containers by means of corresponding platforms 21 is lifted further one step, so that they are ready to be engaged by the carriage 19 when said carriage has been brought back to its previous position. At the same time the earlier containers 4 are removed from the roller platform 17 and rolled out one by one onto the platforms 20 of the elevator installation 18. The platforms 20 then are lowered a step for each container leaving the roller platform 17, so that new empty platforms 20 one after another arrive in position right in front of one of the platforms 17. When the containers 4 reach the conveyor 11 they are rolled out onto the same changing their direction of travel and are transported on the conveyor along the edge of the embankment to the point where they by means of the shunt station illustrated in FIGS. 5 and 6 again change their direction of travel and are introduced in the buffer storage 6.

In this manner layer after layer of containers in the vertical staple is removed until the corresponding platform 21 has reached its uppermost position and the corresponding section of the hold is emptied. Now the carriage 19 is adjusted so that its stop position is above the next station of the cross row and the corresponding section of the hold is emptied in the same manner.

After a cross row of containers has been removed the installation 5 has to be displaced along the ship to a new cross row, which is unloaded in the same manner. Trimming conditions may of course make it necessary to only partly unload a staple and thereafter proceed to another staple.

By the control installation 13 for the direction of the routing the containers are moved from the buffer storage 6 to be conveyed to the railroad loading platform 8, the truck loading platform 10 or the intermediate warehouse 7. The manner in which the loading and the taking in and taking out of storage is taking place should have been clearly evident from the foregoing.

When loading a ship the desired containers are unloaded at 8 and 10 from the respective hauling means and at suitable occasions are taken out of the warehouse, whereafter they via the conveyor 11 are brought to the loading installation 5. By means of the elevator 18 they are then brought up to the level of the roller platform 17 and rolled onto said platform until a member of them suitable for simultaneous transportation by means of the carriage 19 has been reached. From the platform 17 said containers are then by means of the carriage 19 brought to the desired position above the opening of the hold, where the platforms 21 have been adjusted in their uppermost position, or if containers already are loaded onboard the top sides of the upper ones of said containers, should have been adjusted in level with the top edges of the bulkheads 24. On the platforms 21 and the earlier loaded containers respectively the new container now is deposited and the platform is lowered one step. In this manner the loading operation is continued until the desired quantity of load has been brought onboard.

As is evident from the above, the loading installation 5 performs a very rational work by the vertical movement in upwards direction, the sidewise transportation, and the lowering down operation taking place simultaneously, and this to a considerable extent occurring with a number of containers being in movement at the same time. By this arrangement the shortest possible loading and unloading times are obtained, and in comparison with conventional hoisting by crane the time saving is quite considerable. In addition the risks of damage by the load units knocking against the other, pivoting or hitting any object or falling down are practically eliminated. As should be evident from the figures it is also possible to arrive at a high degree of independence from precipitation or wind, as it is easy to equip the machinery of the installation and the open hold with protective arrangements. It is a matter of course that the installation illustrated in FIG. 1 only represents an example. Thus each one of the different components in its case can be excluded, be incorporated in greater number and be of smaller or bigger size according to the local requirements. Generally a port installation comprises a number of mooring places for ships which are served by a number of installations 5 for loading and unloading. Said loading and unloading installations may then all of them or in groups be connected with an installation for the handling at ground level of the goods with desired number of loading platforms for hauling means and intermediate warehouses.

For most needs an installation of the size illustrated in FIG. 1 should thus not be sufficient. However, already said installation represents anyhow a considerable capacity, and one can therefore imagine that the building and taking in use of the installation is taking place gradually. Already the loading and unloading installation 5 according to the invention makes possible an important rationalization even if it is not connected to any conveyor, but instead is combined with conventional ground hauling by means of lifting trucks. Such a combination can thus constitute a phase of a complete construction program.

However, taking in use a loading and unloading installation 5 such as it has been described above implies ships equipped with lifting platforms according to FIG. 3. In the initial stages of the exploitation one cannot calculate to serve only such ships, perhaps not even the greater part being such ships. When serving conventional container cargo vessels without lifting platforms it is necessary to supplement the loading and unloading installation by lifting means for lifting the container out of the hold. A variation is then to design the carriage 19 (FIG. 2) with a lifting means, so that the whole frame supporting the gripping means can be lowered down in the hold and be attached to the containers for their lifting up operation. However, this is not very rational, because the times obtained are approximately the same as when conventional wire lift is used, the only advantage obtained being a more closed path of transportation and of course also the possibility to serve ships equipped with lifting platforms in the most rational manner. Therefore, a better alternative is to equip the bracket arm installation supporting the carriage with special lifting means, by means of which a number of containers can be brought up to the level of the carriage and be coupled to said carriage for transportation in inwards direction to the roller table. By this arrangement the lifting operation can take place during said sidewise transportation, whereby time is saved. As an intermediate step the ships can be equipped with lifting platforms below the staples of containers, but without lifting means of other kind, the lifting means on the bracket arm installation then being coupled to said platforms in succession one step at a time lifting up the staples as has been described previously.

Also in other respects modifications can be imagined within the scope of the following claims.

I claim:

1. Loading and unloading installation for load units of standardized types to be transported by ships at a wharf comprising a frame capable of being mounted on the loading wharf and provided with a lateral beam capable of horizontally extending sidewards of the wharf over an intended position for the ship to be loaded or unloaded, a carriage device being moveably arranged on said beam for transportation of the units horizontally along said beam, a lifting device in said frame being arranged for the vertical transportation of the units between the wharf and said carriage, a second lifting device at the outer end of said beam being arranged for the vertical transportation of the units between the hold of the ship and the carriage on said beam, said beam being vertically moveable in said frame, gripping means on said carriage arranged to grip the load units at their upper part so that they are transported in a hanging position and said first lifting means in said frame being a paternoster type elevator which is arranged to cooperate with said carriage in the entire range in which said carriage is provided to work by said vertical displacing of said beam.

2. Installation according to claim 1, characterized by said paternoster type elevator being arranged to transport the load units one by one, while said carriage is arranged for groupwise transportation of the units, a buffer storage being arranged between the upper level for said lifting device and the delivery and reception point of said carriage.

3. Installation according to claim 1, characterized by said lifting means arranged for the vertical transportation between the hold of the ship and said carriage comprising a number of driven platforms each one displaceable along a vertical path, each one of said platforms designed to support at least one vertical staple of load units and step by step, each step comprising one layer, to bring the load units up to or down from said carriage in cooperation with the receipt or the delivery of the load units by said carriage.

4. Installation according to claim 3, characterized by a number of said lifting means with platforms displaceable in a vertical path being arranged in the holds of a number of ships which are used in connection with the installation.

5. Installation according to claim 1, characterized by a warehouse (7) being arranged in connection with the terminal of the lifting device (18, 20) at the plane (2) of the wharf, said warehouse (7) being destined to store the load units (4) and comprising a number of vertical compartments (50) each one arranged to receive in suspension a number of load units (4) and at their low ends terminating above a transportation plane at such a height that a load unit can be brought below the compartments (50) on said plane, preferably equipped with a conveyor arrangement (11) to positions right below the different compartments, a number of carriages (48) preferably provided to move on said conveyor arrangement and provided with lifting means being arranged for the lifting up operation of the load units (4) into a compartment (50), and moreover in the bottom edges of the compartments (50) blocking means being arranged for the holding of load units (4) lifted up in the compartments (50).

6. Installation according to claim 5, characterized by the lifting means being arranged for the lifting height substantially corresponding the height of a load unit (4) and by the earlier delivered units in a compartment lifted up by the latest one arriving, in case several load units (4) are going to be stored in the same compartment (50).

* * * * *